(12) United States Patent
Friedel et al.

(10) Patent No.: US 12,306,744 B2
(45) Date of Patent: May 20, 2025

(54) METHODS AND SYSTEMS FOR ROBOTIC TESTING OF FUEL POINT OF SALE TERMINALS

(71) Applicant: Safeway Inc., Pleasanton, CA (US)

(72) Inventors: Mike Friedel, Pleasanton, CA (US); Martha Crosley, Pleasanton, CA (US); Joshua Wilber, Pleasanton, CA (US); Bruce Lang, Pleasanton, CA (US); Subashree Narasimhan, Pleasanton, CA (US)

(73) Assignee: SAFEWAY INC., Pleasanton, CA (US)

( * ) Notice: Subject to any disclaimer, the term of this patent is extended or adjusted under 35 U.S.C. 154(b) by 934 days.

(21) Appl. No.: 17/461,584

(22) Filed: Aug. 30, 2021

(65) Prior Publication Data

US 2022/0194775 A1 Jun. 23, 2022

Related U.S. Application Data

(60) Provisional application No. 63/128,595, filed on Dec. 21, 2020.

(51) Int. Cl.
*G06F 11/3668* (2025.01)
*B25J 11/00* (2006.01)
(Continued)

(52) U.S. Cl.
CPC ......... *G06F 11/3688* (2013.01); *B25J 11/008* (2013.01); *G06F 8/65* (2013.01);
(Continued)

(58) Field of Classification Search
CPC .......... G06F 11/3688; G06F 8/65; G06F 8/71; G06F 11/3664; G06F 11/1433;
(Continued)

(56) References Cited

U.S. PATENT DOCUMENTS 10,260,930 B2 * 4/2019 Trottier ................... G01F 25/24
10,810,473 B1 * 10/2020 Joseph .................... G06K 13/14
(Continued)

FOREIGN PATENT DOCUMENTS

CA 2305561 A1 * 8/1998 .............. G01M 3/08

OTHER PUBLICATIONS

Alexander, Tom "Developing a DevOps Testing Strategy: Benefits, Best Practices & Tools" 2018, retrieved from https://smartbear.com/blog/devops-testing-strategy-best-practices-tools/ on Sep. 5, 2024 (Year: 2018).*

*Primary Examiner* — Rehana Perveen
*Assistant Examiner* — Troy A Maust
(74) *Attorney, Agent, or Firm* — Conley Rose, P.C.; Rodney B. Carroll

(57) ABSTRACT

A method of providing fuel to consumers at fuel pumping stations. The method comprises installing a given version of a software update in a fuel pump simulator; testing the given version of the software update in the fuel pump simulator by an automated fuel pump test platform, wherein the testing comprises a personal identification number (PIN) entry robot of the automated fuel pump test platform keying a PIN into a PIN pad of the fuel pump simulator and wherein the PIN pad of the fuel pump simulator is maintained at an angle between 30 degrees relative to horizontal and 60 degrees relative to horizontal; and detecting an error in the given version of the software update by the automated fuel pump test platform.

26 Claims, 7 Drawing Sheets

(51) Int. Cl.
  *G06F 8/65* (2018.01)
  *G06F 8/71* (2018.01)
  *G06F 11/3698* (2025.01)
  *G06Q 20/32* (2012.01)
  *G06Q 20/40* (2012.01)
  *B67D 7/04* (2010.01)
  *G06F 11/14* (2006.01)

(52) U.S. Cl.
  CPC ............ *G06F 8/71* (2013.01); *G06F 11/3698* (2025.01); *G06Q 20/3278* (2013.01); *G06Q 20/4012* (2013.01); *B67D 2007/0442* (2013.01); *G06F 11/1433* (2013.01)

(58) Field of Classification Search
  CPC ............... B25J 11/008; G06Q 20/3278; G06Q 20/4012; B67D 2007/0442; G07F 7/1033; G07F 13/02
  See application file for complete search history.

(56) References Cited

U.S. PATENT DOCUMENTS

| | | | |
|---|---|---|---|
| 11,516,872 B2 * | 11/2022 | Jaeger | G07F 13/025 |
| 11,710,117 B1 * | 7/2023 | Wall | G06Q 20/3278 |
| | | | 235/380 |
| 2017/0308965 A1 * | 10/2017 | Morris | G06V 40/168 |
| 2019/0163618 A1 * | 5/2019 | Akiona | G06Q 10/06 |
| 2021/0011840 A1 * | 1/2021 | Zhou | G06F 11/3688 |

\* cited by examiner

METHODS AND SYSTEMS FOR ROBOTIC TESTING OF FUEL POINT OF SALE TERMINALS

CROSS-REFERENCE TO RELATED APPLICATIONS

The present application is a non-provisional of and claims priority to U.S. Provisional Patent application No. 63/128,595 filed Dec. 21, 2020, entitled "Methods and Systems for Robotic Testing of Fuel Point of Sale Terminals," by Mike Friedel, which provisional patent application is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fuel pumps at gas stations comprise a variety of mechanical, electrical, and electronic components. The fuel pump can act as a point-of-sale terminal for initiating and completing fuel purchases through an interface. This interface may include a plurality of fuel grade selection buttons, a personal identification number (PIN) entry pad, various displays, and a payment card interface. The displays can prompt the customer to take actions to proceed through the steps of pumping fuel and can notify the customer of error conditions. A plurality of fuel pumps at a single gas station may be controlled by a fuel computer located on the premises of the gas station. The fuel pump and/or fuel computer can communicate with backend systems such as a payment card institution and a bank account. Payments made with a card may result in a payment in the amount of a gas purchase being transferred from an account of a customer to an account of the service station. Before the fuel is pumped to the customer's vehicle or gas can the payment card may be validated with the payment card institution. The pumping of the fuel may be subjected to conditions, for example a maximum dollar value amount. Much of the functionality a customer experiences at such a fuel pump at a gas station is provided by or monitored by software and/or firmware executing on one or more processors or microcontrollers in the fuel pumps and/or in the fuel computer. When fuel pump software and/or firmware changes and when the fuel computer software changes, for example as a result of a software update, the changed software and/or firmware is desirably tested in a test environment before it is deployed to actual fuel pumps and/or to actual fuel computers.

SUMMARY

In an embodiment, a method of providing fuel to consumers at fuel pumping stations is disclosed. The method comprises installing a given version of a software update in a fuel pump simulator, testing the given version of the software update in the fuel pump simulator by an automated fuel pump test platform, wherein the testing comprises a personal identification number (PIN) entry robot of the automated fuel pump test platform keying a PIN into a PIN pad of the fuel pump simulator and wherein the PIN pad of the fuel pump simulator is maintained at an angle between 30 degrees relative to horizontal and 60 degrees relative to horizontal, and detecting an error in the given version of the software update by the automated fuel pump test platform.

In another embodiment, a fuel pump functional test system is disclosed. The system comprises a fuel pump simulator comprising a personal identification number (PIN) pad mounted at an angle between 30 degrees to horizontal and 60 degrees to horizontal, a plurality of fuel grade price displays, a plurality of relays, a fuel display, a main display, and a fuel computer communicatively coupled to the PIN pad, the fuel grade price displays, the relays, the fuel display, and the main display, a PIN entry robot aligned with the PIN pad to align an axis of actuation of the PIN entry robot to be substantially perpendicular to a plurality of keys of the PIN pad, and at least one camera aligned to take pictures of one or more of the displays. The system further comprises a fuel pump test integration subsystem communicatively coupled to the relays, to the PIN entry robot, and to the at least one display camera, comprising a processor, a non-transitory memory storing a plurality of fuel pump test cases, and an application stored in the non-transitory memory. When executed by the processor, the application executes at least some of the fuel pump test cases, when executing one of the fuel pump test cases, commands relays to actuate, when executing the fuel pump test case, commands the PIN entry robot to actuate pushbuttons of the PIN pad, when executing the fuel pump test case, receives a picture of a fuel grade price display from the at least one camera, a picture of the main display, and a picture of a fuel display, when executing the fuel pump test case, determines a test case result based on comparing information presented in the picture of the fuel grade display. information presented in the picture of the main display, and information presented in the picture of the fuel display to expected results defined by the test case, and stores the test results of executing the at least some of the fuel pump test cases in the non-transitory memory.

In yet another embodiment, a method of testing fuel pumps is disclosed. The method comprises checking a software change into a configuration control system, in response to checking the software change into the configuration control system, building a fuel computer executable by a software builder application executing on a computer system based on the software change, and downloading the fuel computer executable into a fuel computer of a fuel pump simulator by a software deployment application executing on the computer system. The method further comprises launching execution of a testing application on a fuel pump test integration subsystem by the application, and executing a plurality of fuel pump test cases by the testing application. Executing a fuel pump test case comprises commanding relays of the fuel pump simulator to actuate by the testing application, commanding input of payment information to the fuel pump simulator by the testing application, receiving information about the response of the fuel pump simulator by the testing application, and determining a test case result by the testing application based on comparing the information about the response of the fuel pump simulator to expected output defined by the test case. The method further comprises sending a plurality of test case results by the testing application to the software builder application.

In yet another embodiment, a method of testing a fuel pump is disclosed. The method comprises at least partly disassembling a fuel pump simulator, mounting a personal identification number (PIN) pad of the disassembled fuel pump simulator, mounting a payment card reader of the disassembled fuel pump simulator, coupling a PIN entry robot mechanically to a first jig to align with the PIN pad, coupling a payment card entry robot mechanically to a second jig to align with the payment card reader, communicatively coupling a fuel computer to the PIN pad and to the payment card reader, and communicatively coupling a fuel pump test integration subsystem to the PIN entry robot and to the payment card entry robot. The method further comprises executing a fuel pump testing application by the fuel pump test integration subsystem that commands the PIN entry robot to actuate pushbuttons of the PIN pad, commands the payment card entry robot to provide payment information to the payment card reader in accordance with fuel pump test cases, receives feedback from the fuel pump simulator, determines fuel pump pass-fail results by comparing the received feedback to expected fuel pump test case results, and stores the fuel pump pass-fail results in a non-transitory memory of the fuel pump test integration subsystem.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
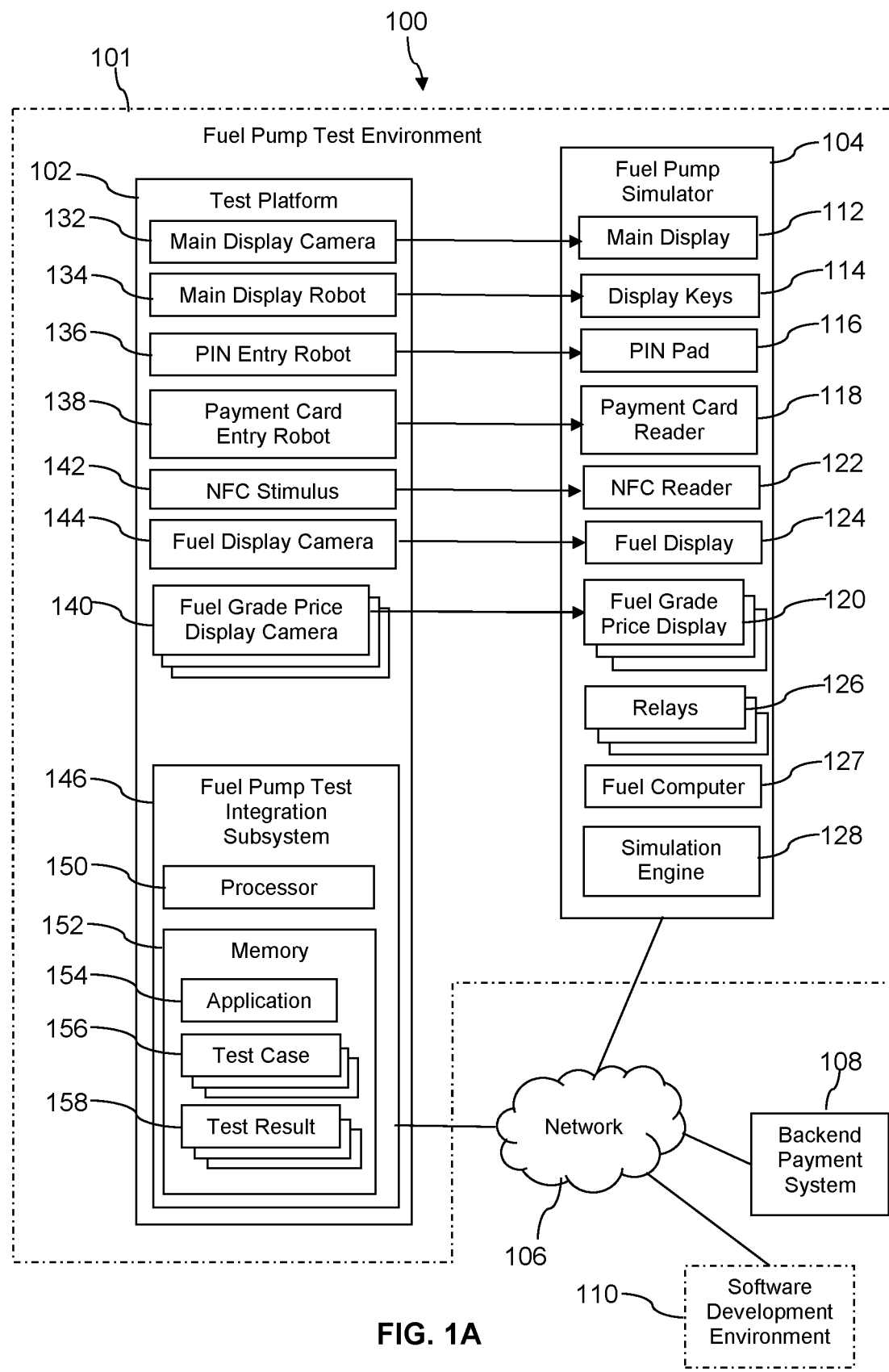
FIG. 1A and FIG. 1B are a block diagram of a system according to an embodiment, of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Fuel pump system testing is manually intensive because of the desired inclusion of physical fuel pump hardware in the testing system, due to the need for security keys within the devices and emulators not being available or available but not trustworthy. The number of test cases to be executed is significant. Running the test cases associated with a software and/or firmware update to a fuel pump system and analyzing the test results engages subject matter experts and manual testers and also ties up the test environment itself. Firmware is a specific class of software that may refer to relatively low-level logic instructions and data stored in a flash read-only-memory (ROM) of a hardware device to control how that hardware device operates. For concision, the term software will be used commonly hereinafter to refer to both software and firmware.

There may be as many as 10 software updates to a fuel pump system per year that are tested. Testing a software update to the fuel pump system may entail completing each of the test cases 2, 3, or 4 times, since errors discovered in an early run of test cases typically drive revisions to the software which then needs to be tested with the test cases again. Fuel pump system testing is desirable to catch software errors early to reduce costs associated with correcting software errors and to maintain customer satisfaction. Detecting and correcting a fuel pump system software error before the software is deployed to thousands of fuel pumps located at hundreds of fuel pumping stations (e.g., gas stations) is preferred. The present disclosure teaches an automated fuel pump system test system that speeds the fuel pump system testing process, reduces the labor costs associated with conducting the tests, assures a higher level of accuracy in the testing process, and frees valuable subject matter experts for other important activities.

The test environment comprises a fuel pump simulator that has been partially disassembled and a fuel pump test platform that actuates the fuel pump simulator to test functionality of software installed in the fuel pump simulator and/or in a point-of-sale backend associated with the fuel pump. In an embodiment, the fuel pump simulator comprises a fuel computer that emulates a computer installed at fuel stations that may control the actions of a plurality of fuel pumps at the same fuel station location. In an embodiment, the fuel pump test platform comprises a PIN entry robot to actuate PIN pad keys of the fuel pump simulator, a payment card entry robot to present a payment card to a payment card reader of the fuel pump simulator, a near field communication (NFC) reader, and a plurality of cameras to capture images of a plurality of displays of the fuel pump simulator. The fuel pump test platform further comprises a fuel pump test integration subsystem that executes a test application to command the robots to provide inputs to the fuel pump simulator, monitors the images provided by the cameras, and analyzes information captured in the images to determine a pass/fail result of running test cases.

In an embodiment, at least some components of the fuel pump simulator are acquired from a fuel pump manufacturer as an off-the-shelf product, and a qualified service person disassembles that equipment, at least partially, to enable mounting robots in jigs to interact with fuel pump controls and to enable mounting one or more cameras in shielding boxes over the several displays. The PIN pad of the fuel pump simulator is mounted at an angle of between 30 degrees relative to horizontal and 60 degrees relative to horizontal. The PIN entry robot is mounted with a jig or fixture at an angle between 30 degrees relative to horizontal and 60 degrees relative to horizontal to match the angle of the PIN pad of the fuel pump simulator. In an embodiment, relays are substituted in place of the fuel grade selection buttons of the fuel pump simulator, wired into the fuel pump simulator, and controlled by the fuel pump test integration subsystem.

Figure 1B:
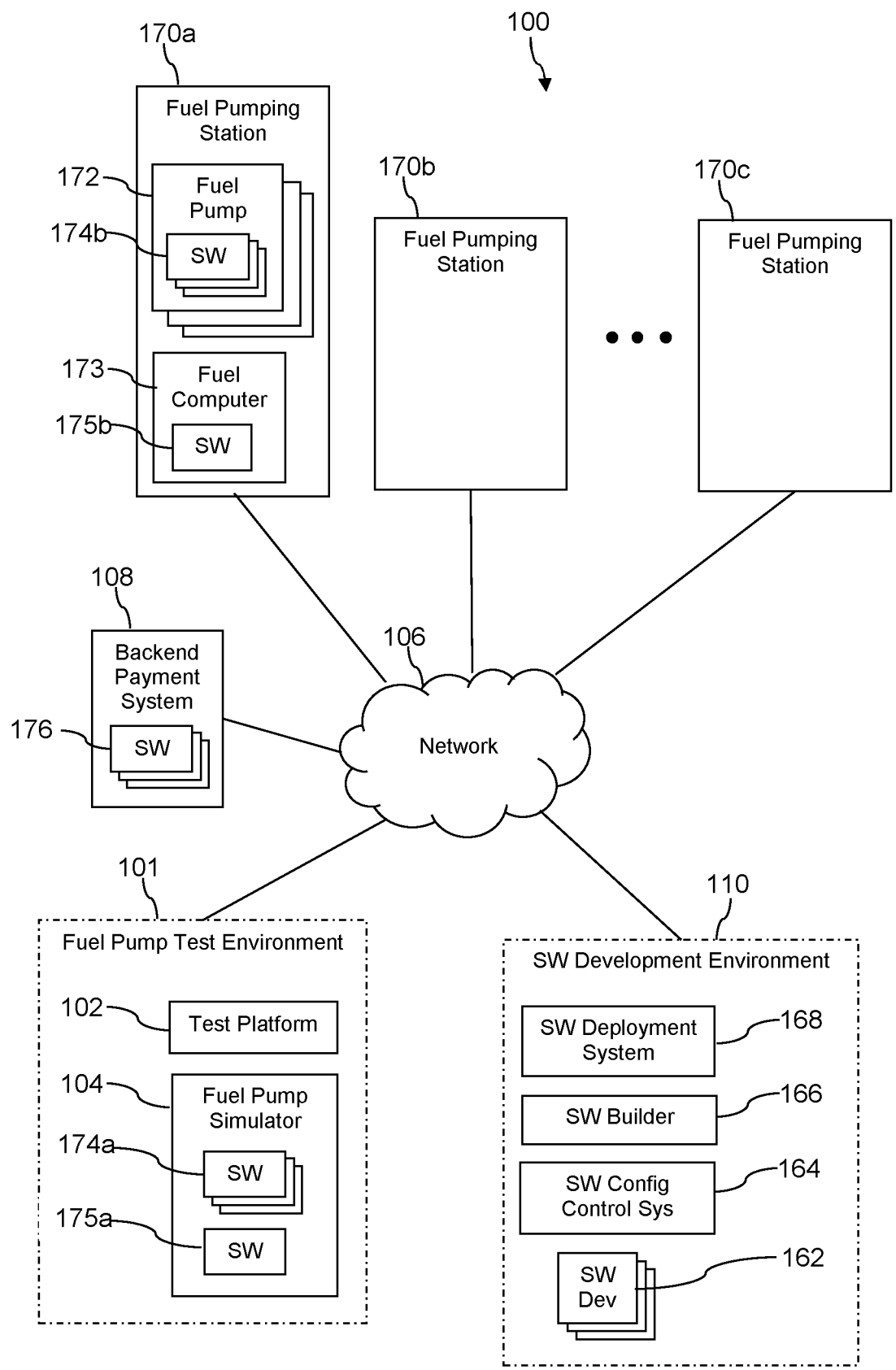

Turning now to FIG. 1A and FIG. 1B, a system 100 is described. In an embodiment, the system 100 comprises a fuel pump test environment 101 having a test platform 102 that interacts with a fuel pump simulator 104, a network 106, a backend payment system 108, and a software development environment 110. In some contexts, the test platform 102 may be referred to as an automated fuel pump test platform. The fuel pump test environment 101 can be used to perform functional testing of a fuel pump and a fuel computer with one or more software versions and/or firmware versions installed. In general, the hardware of fuel pumps may remain constant and unchanged over extended periods of time, but the function of the fuel pumps and/or the fuel computer may be updated multiple times per year by installing software updates and/or firmware updates that change the user experienced functionality of the fuel pumps. For concision, the term software will be used commonly hereinafter to refer to both software and firmware. While the most common software changes may be changes to software executing on the fuel computer, changes to software and/or firmware installed in the fuel pump may occur sometimes as well.

The network 106 comprises one or more public networks, one or more private networks, and/or a combination thereof. The software development environment 110 can develop, revise, and release fuel pump software and/or firmware to the fuel pump simulator 104 and to a plurality of fuel pumps 172 located and a fuel computers 173 located at a plurality of fuel pumping stations 170. Each fuel pumping station 170 typically comprises a single fuel computer 173 and a plurality of fuel pumps 172. Each of the fuel pumps 172 at a fuel pumping station 170 are communicatively coupled to the fuel computer 173 at that fuel pumping station 170. The backend payment system 108 can include a computer system that performs point-of-sale functions in a fuel pumping station (e.g., gas station or convenience store) as well as other parts of a backend payment system such as payment card institutions (credit card institutions and bankcard institutions) and a bank account into which payments for fuel disbursements are deposited from payment card institutions. The backend payment system 108 can be provided by one or more computers. Computers are discussed further hereinafter.

In an embodiment, the fuel pump simulator 104 comprises a main display 112, main display keys 114 associated with the main display 112, a personal identification number (PIN) pad 116, a payment card reader 118, a near field communication (NFC) reader 122, a fuel display 124, a plurality of fuel grade price displays 120, a plurality of relays 126, a fuel computer 127, and a fuel pump simulation engine 128. The relays are substituted in fuel pump simulator 104 to play the role of various components in an actual fuel pump, for example fuel grade selection buttons, fuel handle lifted switch, fuel release trigger lever after the components of the fuel pump simulator 104 are received from a fuel pump manufacturer. It is understood that the fuel pump simulator 104 may comprise any number of fuel grade price displays 120 and any number of relays 126. In an embodiment, the relays 126 are electronic relays.

Some of the components of the fuel pump simulator 104 of the fuel pump test environment 101 are at least partially disassembled upon receipt from the fuel pump manufacturer to promote ease of the test platform 102 interacting with the fuel pump simulator 104. For example, as delivered by a fuel pump manufacturer, the fuel pump simulator 104 may resemble a fuel pump as a customer would know it from filling his or her car at conventional gas stations. The fuel pump simulator 104, as received from the manufacturer, may have the main display 112 with main display keys 114 located on either side of the main display 112 and both arranged to be substantially vertical in a vertical flat panel. The fuel grade price displays 120 and fuel pump select switches would be arranged substantially vertical and mounted in the flat panel. The payment card reader would be mounted into the flat panel. The NFC reader would be mounted into the flat panel. The PIN pad would be mounted into the flat panel at an angle of between 30 degrees relative to horizontal and 60 degrees relative to horizontal. The fuel pump simulator 104 of the fuel pump test environment 101, by contrast, has had the main display 112 and main display keys 114 removed from the flat panel and arranged horizontally in a jig or fixture. The fuel pump simulator 104 of the fuel pump test environment 101 has had the PIN pad 116 removed from the flat panel and secured in a jig or fixture. The fuel pump simulator 104 of the fuel pump test environment 101 has had the fuel display 124 removed from the flat panel and arranged horizontally in a jig or fixture. The fuel pump simulator 104 of the fuel pump test environment 101 has had the fuel grade price displays 120 removed from the flat panel and arranged horizontally in a jig or fixture. The fuel pump simulator 104 of the fuel pump test environment 101 has had the fuel grade select buttons functionally replaced by a plurality of relays 126. The fuel pump simulator 104 has had the pump lift switch and the pump handle trigger replaced by relays 126.

The simulation engine 128 comprises a processor that can execute a fuel pump simulation application and interoperate with the items 112-127 of the fuel pump simulator 104 to simulate fuel pump operations. The simulation engine 128 is communicatively coupled to the main display 112, the main display keys 114, the PIN pad 116, the payment card reader 118, the NFC reader 122, the fuel grade price displays 120, the relays 126, and the fuel computer 127. For example, if a payment card is validated by the payment card reader 118 and a fuel grade selected (e.g., the test platform 102 actuates the associated relay 126), the simulation engine 128 simulates a rate of flow of fuel, increments the indicated gallons of fuel delivered as displayed by the fuel display 124, increments the fuel cost accumulated as displayed by the fuel display 124 as if fuel were really being delivered to a vehicle's fuel tank. In an embodiment, the simulation engine 128 may interact with the backend payment system 108 to simulate validation of presented payment cards in the payment card reader 118 and/or to complete a payment to a financial account from the presented payment card account. In an embodiment, the simulation engine 128 may interact with the backend payment system 108 to simulate validation of presented payment cards to the NFC reader 122 and/or to simulate completion of a payment to a financial account from the presented payment card account. Alternatively, the simulation engine 128 may simulate such payment transactions with the backend payment system 108. Because the fuel pump simulator 104 has the same software installed that later may be installed in customer-facing fuel pumps 172 and the fuel computer 173 located at commercial fuel pumping stations 170, and because the fuel pump simulator 104 comprises the same hardware as that provided in the customer-facing fuel pumps 172, testing based on using the fuel pump simulator 104 may be deemed to test the software functionally before installing in the customer-facing fuel pumps 172 and/or the fuel computer 173.

In an embodiment, the test platform 102 comprises a main display camera 132, a main display keys robot 134, a PIN entry robot 136, a payment card entry robot 138, an NFC stimulus device 142, a fuel display camera 144, one or more fuel grade price display cameras 140, and a fuel pump test integration subsystem 146. It is understood that in different embodiments, different numbers of cameras may be provided to monitor the various displays (e.g., the main display 112, the fuel display 124, and the fuel grade price displays 120). For example, in some cases, one camera may monitor two or more of the displays. The main display camera 132 is mounted in a jig or fixture that directs it at the main display 112 so it is able to capture pictures (e.g., digital images) of what is presented on the main display 112. In an embodiment, the main display camera 132 is mounted inside a shielding box that is placed over the main display 112 to exclude light from other sources. The main display camera 132 is communicatively coupled to the fuel pump test integration subsystem 146 and provides pictures of the main display 112 to the fuel pump test integration subsystem 146 for analysis.

The main display keys robot 134 is mounted in a jig or fixture that secures it in alignment with the main display keys 114 where the main display keys robot 134 can actuate main display keys 114 under command from the fuel pump test integration subsystem 146. The main display keys robot 134 is communicatively coupled to the fuel pump test integration subsystem 146. In an embodiment, the main display keys robot 134 comprises a plurality of plunger-type actuators, for example 2 columns of 4 plungers each to engage with the main display keys 114 (e.g., the main display keys are arranged as 4 keys on a left side of the main display 112 and 4 keys on a right side of the main display 112).

The PIN entry robot 136 is mounted in a jig or fixture that secures it in alignment with the PIN pad 116 where the PIN entry robot 136 can actuate the pushbuttons of the PIN pad 116 under command from the fuel pump test integration subsystem 146. For example, the PIN entry robot 136 is aligned with the PIN pad 116 to align an axis of actuation of the PIN entry robot 136 to be substantially perpendicular to a plurality of keys of the PIN pad 116. The PIN entry robot 136 may comprise one or more plunger-type actuators. The PIN entry robot 136 may be aligned with the PIN pad 116 such that the plunger-type actuator actuates or moves perpendicularly to a plane defined by the keys of the PIN pad 116 to engage one or more keys of the PIN pad 116. The PIN entry robot 138 is communicatively coupled to the fuel pump test integration subsystem 146. While referred to as a PIN pad 116, the PIN pad 116 can be used for entering not just personal identification numbers (PINs) but also other numeric information such as a phone number, a zip-code, a desired dollar amount to be pumped. In addition to numeric keys corresponding to digits 0 through 9, the PIN pad 116 may comprise four soft membrane switches on a left side of the digit keys and four soft membrane switches on the right side of the digit keys. These soft membrane switches may likewise be actuated by the PIN entry robot 136 under command from the fuel pump test integration subsystem 146. The soft membrane switches may be used for various control inputs, for example such as to prompt entry of fast forward phone number, to cancel an entry, to select help or assistance from the cashier.

Figure 2A:
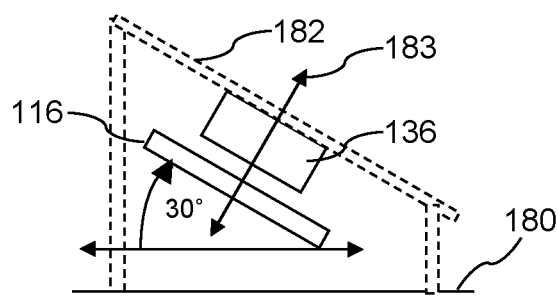
FIG. 2A, FIG. 2B, and FIG. 2C are illustrations of a PIN pad, a PIN entry robot, and a jig retaining the PIN entry robot in a position relative to the position of the PIN pad according to embodiments of the disclosure.
Figure 2B:
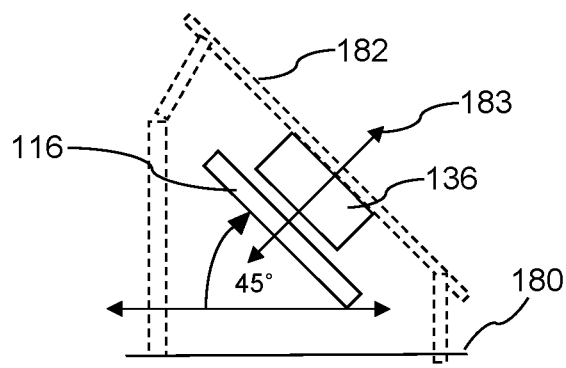
Figure 2C:
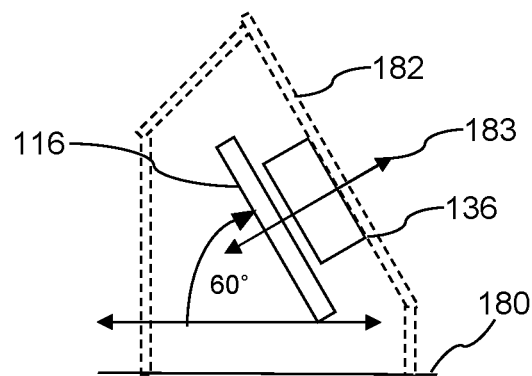

Turning now to FIG. 2A, FIG. 2B, and FIG. 2C, the mounting of the PIN entry robot 136 is described. The PIN entry robot 136 is mounted so that its alignment matches the alignment of the PIN pad 116. For example, in FIG. 2A, the PIN pad 116 is secured at about 30 degrees relative to the horizontal (e.g., a plurality of keys of the PIN pad 116 may define a planar surface at an angle of about 30 degrees relative to the horizontal surface 180). The PIN entry robot 136 is mounted in a jig 182 proximate to the PIN pad 116 and at an angle of about 30 degrees relative to a horizontal surface 180, such that an axis of actuation 183 of the PIN entry robot 136 is substantially perpendicular to the PIN pad 116 (e.g., perpendicular to the plane defined by the keys of the PIN pad 116). The PIN entry robot 136 may comprise one or more plunger-type actuators that actuate parallel to the axis of actuation 183 to activate the keys of the PIN pad 116, for example by extending to activate and retracting to deactivate keys of the PIN pad 116.

In FIG. 2B, the PIN pad 116 is secured at about 45 degrees relative to the horizontal surface 180 (e.g., the planar surface defined by the keys of the PIN pad 116 make an angle of about 45 degrees relative to the horizontal surface 180). The PIN entry robot 136 is mounted in the jig 182 proximate to the PIN pad 116 and at an angle of about 45 degrees relative to the horizontal surface 180, such that the axis of actuation 183 of the PIN entry robot 136 is substantially perpendicular to the PIN pad 116. In FIG. 2C, the PIN pad 116 is secured at about 60 degrees relative to the horizontal surface 180 (e.g., the planar surface defined by the keys of the PIN pad 116 make an angle of about 60 degrees relative to the horizontal surface 180). The PIN entry robot 136 is mounted in the jig 182 proximate to the PIN pad 116 and at an angle of about 60 degrees relative to the horizontal surface 180, such that the axis of actuation 183 of the PIN entry robot 136 is substantially perpendicular to the PIN pad 116. It is understood that the PIN pad 116 may be secured in the jig 182 at any angle between 30 degrees and 60 degrees relative to the horizontal surface 180 and that the PIN entry robot 136 is mounted in the jig 182 so as to maintain about the same angle relative to the horizontal surface 180 as the PIN pad 116 (e.g., to maintain the axis of actuation 183 of the PIN entry robot 136 about perpendicular to the plane of the PIN pad 116). In an embodiment, a security mechanism built into the PIN pad 116 monitors the angle of the PIN pad 116 to detect external tampering, and this security mechanism militates the angle of the PIN pad 116 and consequently of the PIN entry robot 136.

With reference again to FIG. 1A, the payment card robot 138 is mounted in a jig or fixture that secures it in alignment with the payment card reader 118 where the payment card robot 138 can present a payment card proxy to the payment card reader 118 to be read under command from the fuel pump test integration subsystem 146. The payment card robot 138 is communicatively coupled to the fuel pump test integration subsystem 146. In an embodiment, presenting a payment card proxy entails the payment card robot 138 inserting the payment card proxy into the payment card reader 118 to be read in the manner of a credit card or debit card. In an embodiment, a test case may provide a simulated payment exchange by emitting electronic payment information by the NFC stimulus device 142 (e.g., emitting low power radio waves or electromagnetic waves that carrier carry the payment information) which is then received by the NFC reader 122. In an embodiment, the NFC stimulus device 142 is mechanically coupled to the NFC reader 122, for example by means of a bracket or brace, and the fuel pump test integration subsystem 146 is communicatively coupled to the NFC stimulus device 142 by a wire or cable.

As used herein, the term payment card proxy means a device that is capable of presenting the electronically readable information associated with a credit card and/or a device that is capable of presenting the electronically readable information associated with a contactless payment card. For example, the fuel pump test integration subsystem 146 may command the payment card proxy to present credit card magnetic stripe information associated with a first credit card institution and a particular credit card account on a first insertion into the payment card reader 118 and may command the payment card proxy to present credit card magnetic stripe information associated with a second credit card institution and a different particular credit card account on a second insertion into the payment card reader 118.

The one or more fuel grade price display camera 140 is mounted in one or more jigs or fixtures that direct them to a corresponding one of the fuel grade price displays 120. In an embodiment, each of the fuel grade price display cameras 140 is mounted inside a separate shielding box that is secured in place over its corresponding fuel grade display 120 to exclude light from other sources. Each of the fuel grade price display cameras 140 is communicatively coupled to the fuel pump test integration subsystem 146 and provides pictures of its corresponding fuel grade price display 120. It is understood that one fuel grade price display camera 140 may take pictures of one, two, three, four, or more fuel grade price displays 120 at the same time, and the display of each different fuel grade price display 120 can be segregated from the single camera image and analyzed separately by the fuel pump test integration subsystem 146, for example by the application 154 executing on the processor 150.

In an embodiment, the fuel pump test integration subsystem 146 comprises a processor 150 and a memory 152. The fuel pump test integration subsystem 146 is communicatively coupled to the fuel grade selection relays 126. In an embodiment, the fuel pump test integration subsystem 146 is communicatively coupled to the simulation engine 128.

In an embodiment, the memory 152 comprises a non-transitory portion that stores an application 154, a plurality of test cases 156, and a plurality of test case results 158 (e.g., after at least some of the test cases 156 have been executed by the application 154). When executed by the processor 150, the application 154 automatically tests the fuel pump simulator 104 in accordance with at least some of the test cases 156, analyzes the results of executing the test cases 156, and generates test case results 158 based on analyzing the results of executing the test cases 156. While executing a test case 156, the application 154 sends commands and/or control signals to one or more of the main display keys robot 134, the PIN entry robot, 136 the payment card entry robot 138, the NFC stimulus device 142, and the relays 126 to interact with the fuel pump simulator 104, for example in a manner similar to how a customer at a real fuel pump would interact with the payment card reader 118, the main display keys 114, the PIN pad 116, the NFC reader 122, and the fuel grade select pushbuttons (here replaced by some of the relays 126). The application 154 monitors feedback from the fuel pump simulator 104 by receiving one or more pictures of the main display 112 sent by the main display camera 132, by receiving one or more pictures of the fuel display 124 sent by the fuel display camera 144, and by receiving one or more pictures of the fuel grade price displays 120 sent by the fuel grade price display cameras 140. The application 154 compares the feedback received from the cameras 132, 140, 144 and compares these results to expected results defined by the currently executing test case 156 to determine the corresponding test case result 158. If the received feedback is different than the expected results, the test case result 158 may be deemed a failure; if the received feedback is identical to the expected results, the test case result 158 may be deemed a success.

In an embodiment, the test cases 156 are directed to functionally testing the fuel pump simulator 104 (e.g., functionally testing the software and/or firmware installed in the fuel computer 127 and in the main display 112, the payment card reader 118, the NFC reader 122, and possibly other components) and not directed to testing the hardware of the fuel pump simulator 104. For example, the test cases 156 do not seek to verify that a pushbutton of the main display keys 114 can operate correctly at least a predefined number of times without failure, for example operate 100,000 times without failure. In an embodiment, the test cases 156 are directed to testing functionality of the fuel pump simulator 104 associated at least in part with software updates installed into the fuel computer 127 and into various components of the fuel pump simulator 104. For example, the fuel computer 127 may execute fuel control software that commands displays and devices within an actual fuel pump, for example to cause a fuel pump to pump fuel, to cause the fuel display 124 to display accumulated pumped volume of fuel and accumulated cost of pumped fuel. For example, the payment card reader 118 may comprise a processor or microcontroller that executes software that may occasionally be changed and/or updated. For example, the main display 112 may comprise a processor or microcontroller that executes software that may occasionally be changed and/or updated. For example, the fuel grade price displays 122 may comprise a processor or microcontroller that executes software that may occasionally be changed and/or updated. For example, the PIN pad 116 may comprise a processor or microcontroller that executes software that may occasionally be changed and/or updated. In an embodiment, the fuel pump simulator 104 interacts with at least a portion of the backend payment system 108, and the at least a portion of the backend payment system 108 may comprise a computer system that executes software that may occasionally be changed and/or updated.

It is desirable to conduct a functional test with these updated software elements in the fuel pump simulator 104 before propagating that software to customer facing fuel pumps 172 and fuel computers 173 at fuel pumping stations 170. Software updates may be installed into the fuel pump simulator 104 from the software development environment 110. Each different release may define a set of versioned software artifacts. Each different release may be tested using a set of test cases 156 that may include both legacy or regression test cases as well as newly defined test cases directed specifically at changes introduced in the subject release. When a set of test cases 156 has been run and corresponding test results 158 generated, the test results 158 may be sent to developers, managers, and/or the software development environment 110 for analysis. This may result in trouble tickets being opened on different software components. Software developers may correct errors discovered by failed test cases in the software components and rebuild the release with these fixed software artifacts included. The revised software release may be installed on the fuel pump simulator 104, and the test cases 156 may be rerun. This testing-revision-retesting cycle may continue until all test results 158 are successful or until only an acceptable number of non-critical errors remain to be fixed. When testing is deemed completed, the software release may be promulgated to the customer facing fuel pumps 172 and fuel computers 173 at fuel pumping stations 170.

With reference now to FIG. 1B, further details of the software development environment 110 are described. In an embodiment, the software development environment 110 comprises a plurality of software developer workstations 162, a software configuration control system 164, a software builder 166, and a software deployment system 168. It will be appreciated that in different software development environments 110 a variety of other systems may be included and the components identified here may be called different names and the functionality provided by the components identified here may be provided by two or more separate components in different software environments.

The software development workstations 162 may be used to create software, to check software into the software configuration system 164, to checkout software from the software configuration system 164, to edit or revise software, and to cause the software builder 166 to build a release of software artifacts based on contents in the software configuration control system 164. The software configuration control system 164 may store software in various versions. The software configuration control system 164 may restrict access based on credentials presented when invoking actions provided by the software configuration control system 164, whereby to protect the software and to maintain integrity of versions of these artifacts. The software configuration control system 164 may manage check-out and check-in actions to avoid two different developers interfering with each other's work on the same software artifacts. The software referred to here can be any of software and/or firmware and may refer to software artifacts such as source code, executables, data, and intermediate artifacts related to the fuel computer 173 and/or the fuel pumps 172. The software may comprise proprietary code and/or data developed by a retail enterprise (e.g., a convenience store retail chain, a grocery store retail chain, a gasoline store retail chain). The software may comprise operating system code developed by an operating system development company. The software may comprise utility applications developed by third party software developers.

The builder 166 can build executable packages and/or loads of software, based on a defined manifest or 'recipe' of versioned files stored in the software configuration control system 164, for execution on the fuel pump simulator 104, on at least a portion of the backend payment system 108, on the fuel computer 173, and on the fuel pumps 172. Some of the software installed in the fuel pump simulator 104 is represented in FIG. 1B as software 174a (e.g., software and/or firmware installed in components of the fuel pump such as the main display 112, the PIN pad 116, and the fuel display 124), while the software installed in the fuel pump 172 is represented in FIG. 1B as software 174b; some of the software installed in the fuel pump simulator 104 is represented is represented in FIG. 1A 1B as software 175a (e.g., software installed in the fuel computer 127), while the software installed in the fuel computer 173 is represented as software 175b; and the software installed in the at least portion of the backend system is represented as software 176. The software deployment system 168 can handle the details of loading of software 174, 175 built by the software builder 166 into the fuel pump simulator 104 and/or the fuel pumps 172. The distinction between software 174a and software 174b is that software 174a may be in an intermediate state of testing and revision whereas software 174b is the final version of software 174a that successfully emerged from the testing cycle for the subject software release. The distinction between software 175a and software 175b is that software 175a may be in an intermediate state of testing and revision whereas software 175b is the final version of software 175a that successfully emerged from the testing cycle for the subject software release.

In an embodiment, the software configuration control system 164, the software builder 166, the software deployment system 168, and the fuel pump test integration subsystem 146 interwork together so that software changes are automatically tested in the fuel pump test environment 101. When a software developer checks a software update into the software configuration control system 164, the software builder 166 is invoked by the software configuration system 164 to build a new software load based on the recently checked in software update. When it has made a new load, the software builder 166 invokes the software deployment system 168 to install the new load (e.g., software 174a, 175a) on the fuel pump simulator 104. When it has installed the new load, the software deployment system 168 invokes the application 154 to execute and run the test cases 156 on the fuel pump simulator 104 with the new software load installed. In an embodiment, the automatic testing of software changes is not invoked after every check in of changed software into the software configuration control system 164 but instead is invoked periodically, contingent on a change having been checked in, once per day such as at midnight or once per week such as Saturday morning at 3 AM, or at some other periodic interval.

Figure 3:
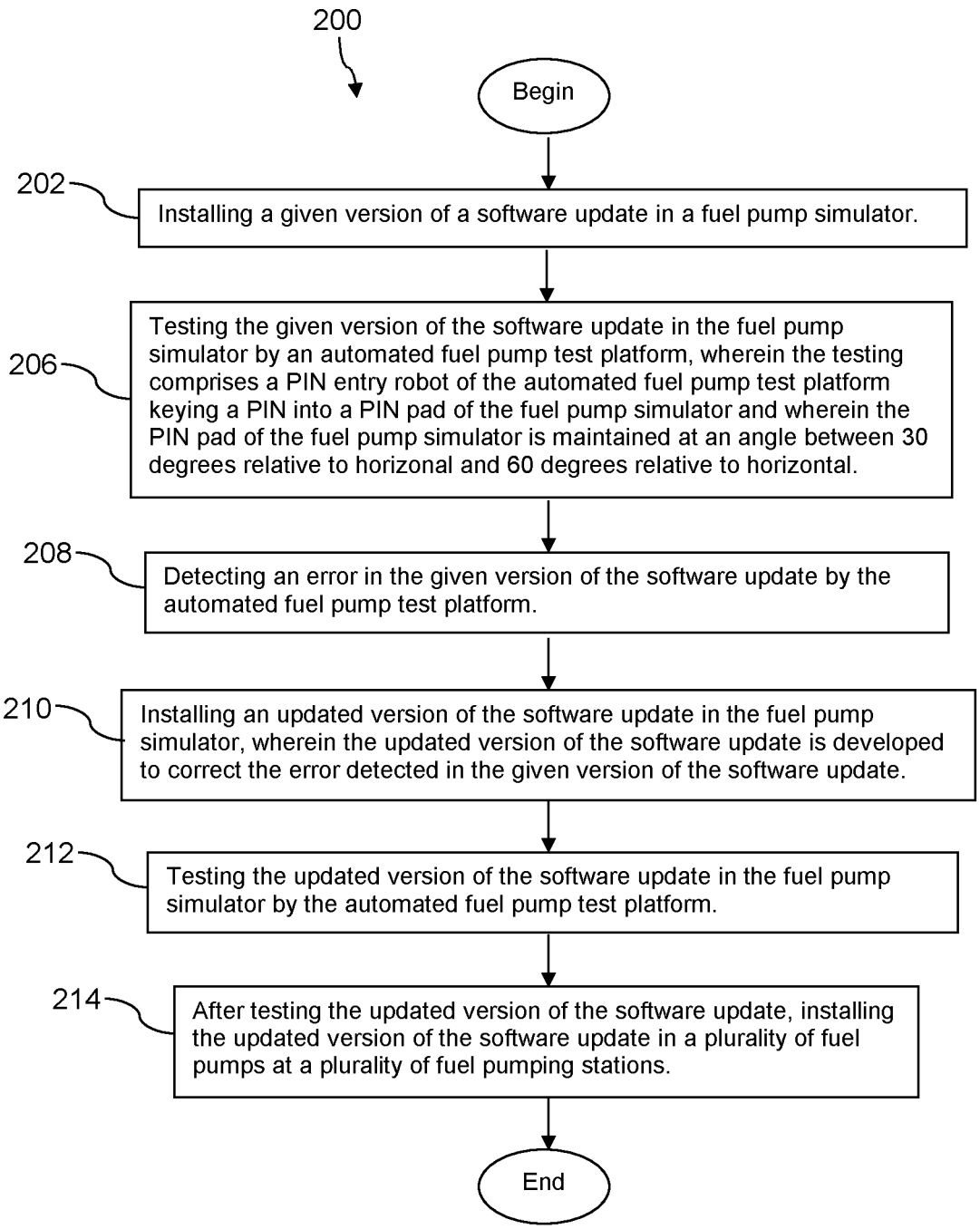
FIG. 3 is a flow chart of a method according to an embodiment of the disclosure.

Turning now to FIG. 3, a method 200 is described. In an embodiment, method 200 is a method of providing fuel to consumers at fuel pumping stations. At block 202, the method 200 comprises installing a given version of a software update in a fuel pump simulator. For example, the software 175a is installed into the fuel computer 127 of the fuel pump simulator 104. For example, the software 174a is installed into one or more components of the fuel pump simulator 104 described above with reference to FIG. 1A, FIG. 1B, FIG. 2A, FIG. 2B, and FIG. 2C. In an embodiment, the processing of block 202 may comprise installing at least some of software 176 into a portion of the backend payment system 108. The given version of the software update may comprise software artifacts and/or firmware artifacts.

At block 204, the method 200 comprises testing the given version of the software update in the fuel pump simulator by an automated fuel pump test platform, wherein the testing comprises a PIN entry robot of the automated fuel pump test platform keying a PIN into a PIN pad of the fuel pump simulator and wherein the PIN pad of the fuel pump simulator is maintained at an angle between 30 degrees relative to horizontal and 60 degrees relative to horizontal. In an embodiment, the PIN entry robot is maintained at substantially the same angle relative to horizontal as the PIN pad. The PIN pad and the PIN entry robot may be maintained at a predefined angle relative to horizontal by one or more jigs or fixtures, as described above with reference to FIG. 2A, FIG. 2B, and FIG. 2C. In an embodiment, the PIN entry robot is maintained in alignment with the PIN pad to align an axis of actuation of the PIN entry robot to be substantially perpendicular to a plurality of keys of the PIN pad. In an embodiment, the fuel pump simulator comprises a plurality of relays, and testing the given version of the software update may comprise sending an activation or actuation signal by the automated fuel pump test platform to the relays.

At block 206, the method 200 comprises detecting an error in the given version of the software update by the automated fuel pump test platform. In an embodiment, detecting an error in the given version of the software update comprises the automated fuel pump test platform comparing display information developed by automatically analyzing pictures of a display of the fuel pump simulator to expected test case results and determining that the display information and the expected test case results do not match.

At block 208, the method 200 comprises installing a modified version of the software update in the fuel pump simulator, wherein the modified version of the software update is developed to correct the error detected in the given version of the software update. In an embodiment, the modified version of software update comprises software artifacts and/or firmware artifacts. In an embodiment, a modified version of the software 175a is installed in the fuel computer 127. In an embodiment, a modified version of the software 174a is installed in one or more components (e.g., the main display 112, the PIN pad 116, the payment card reader 118, the NFC reader 122, or the fuel display 124) of the fuel pump simulator 104. At block 210, the method 200 comprises testing the modified version of the software update in the fuel pump simulator by the automated fuel pump test platform. In an embodiment, the fuel pump simulator comprises a plurality of fuel grade selection relays, and testing the modified version of the software update may comprise sending a selection signal by the automated fuel pump test platform to one of the fuel grade selection relays.

At block 212, the method 200 comprises, after testing the modified version of the software update, installing the modified version of the software update in a plurality of fuel pumps at a plurality of fuel pumping stations. The processing of block 212 may comprise installing the software 175b into the fuel computers 173 located at fuel pumping stations 170. The processing of block 212 may comprise installing the software 174b in the fuel pumps 172 located at fuel pumping stations 170 as described above with reference to FIG. 1B. In an embodiment, the method 200 further comprises, after testing the given version of the software update, installing the software update into a fuel computer and/or into a fuel pump at a fuel pumping station; receiving an input from a payment card by the fuel pump at the fuel pumping station; receiving a fuel grade selection input by the fuel pump at the fuel pumping station; and based on the fuel computer executing the software update (e.g., software 175b) and/or based on the fuel pump at the fuel pump station executing the software update (e.g., software 174b), pumping fuel by the fuel pump at the fuel pump station, whereby a fuel tank of a vehicle is provided with fuel. It is understood that the method 200 may comprise installing the software update (e.g., software 175b) into a fuel computer 173 at each of a plurality of different fuel pump stations. It is understood that the method 200 may comprise installing the software update (e.g., software 174b) into a plurality of fuel pumps and at a plurality of fuel pump stations.

Figure 4:
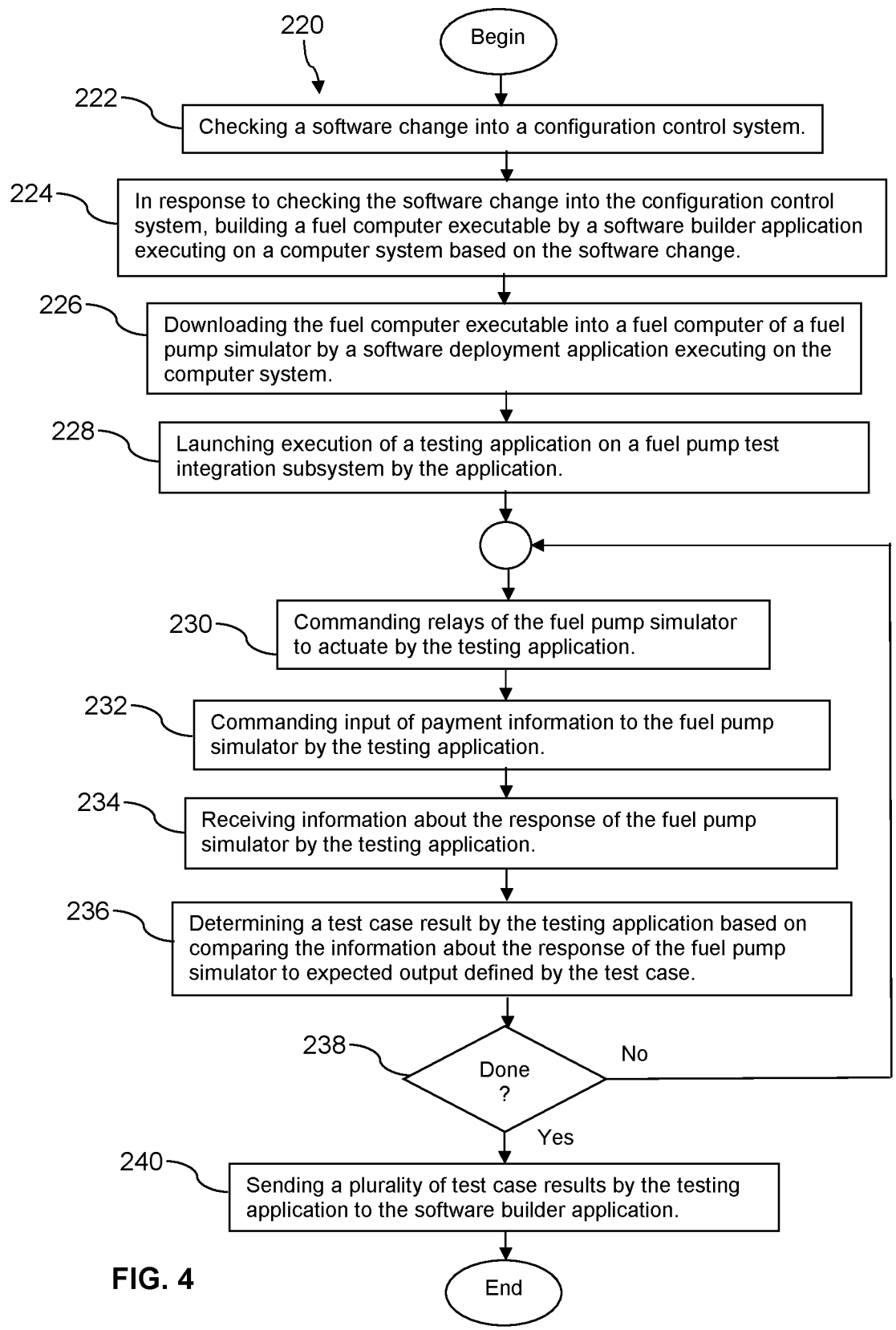
FIG. 4 is a flow chart of another method according to an embodiment of the disclosure.

Turning now to FIG. 4, a method 220 is described. In an embodiment, the method 220 comprises a method of testing fuel pumps. At block 222, the method 220 comprises checking a software change into a configuration control system. The changed software may comprise the software 174. The changed software may comprise the software 175. At block 224, the method 220 comprises, in response to checking the software change into the configuration control system, building a fuel computer executable by an application executing on a computer system based on the software change. For example, the application may be a software builder application (e.g., the software builder 166) that executes on a computer system in the software development environment 110. The fuel computer executable may comprise software and data and may be referred to as software or software artifacts. In an embodiment, the fuel computer executable is substantially the same as the software 175a described above with reference to FIG. 1B. The fuel computer executable may be a derived form of software and data that has been processed by tools (e.g., a compiler tool, an assembler tool, a linker tool, or like tools) to make the executable suitable for executing by a processor of the fuel computer. In an embodiment, the processing of block 224 comprises building a fuel pump executable by the application based on the software change. The fuel pump executable may comprise software and/or firmware and data and may be referred to as software, firmware, or software artifacts. In an embodiment, the fuel pump executable is substantially the same as the software 174a described above with reference to FIG. 1B. The fuel pump executable may be a derived form of software and data that has been processed by tools (e.g., a compiler tool, an assembler tool, a linker tool, or like tools) to make the executable suitable for executing by a processor or computer system, for example executable by one or more processors in the fuel pump simulator 104. The fuel pump executable may comprise a plurality of executables that are to be executed by different processors in the fuel pump simulator 104—for example a first executable to be executed in the main display 112, a second executable to be executed in the PIN pad 116, a third executable to be executed in the payment card reader 118.

At block 226, the method 220 comprises downloading the fuel computer executable into a fuel computer of a fuel pump simulator by a software deployment application, for example by an application executing in the software deployment system 168. In an embodiment, the fuel pump executable is downloaded into the fuel pump simulator by the software deployment system 168 described above with reference to FIG. 1A. In an embodiment, the fuel pump simulator is a partially disassembled fuel pump simulator provided by a fuel pump manufacturer. In an embodiment, the partially disassembled fuel pump simulator replaces fuel grade select pushbuttons with a plurality of fuel grade selection relays.

At block 228, the method 220 comprises launching execution of a testing application on a fuel pump test integration subsystem by the application. Executing the testing application entails executing a plurality of fuel pump test cases by the testing application. For example, the application 154 executes on the processor 150 of the fuel pump test integration subsystem 146 based on one or more of the test cases 156.

At block 230, the method 220 comprises commanding relays of the fuel pump simulator to actuate by the testing application. For example, a test case execution may be started by activating a relay 126 associated with a pump handle lifted switch. The test case execution may continue by activating a relay 126 associated with selection of a specific fuel grade switch. The test case execution may continue by activating a relay 126 associated with triggering flowing fuel through the pump handle into a gas tank. At block 232, the method 220 comprises commanding input of payment information to the fuel pump simulator by the testing application. For example, the testing application may command a PIN entry robot to actuate pushbuttons of a PIN pad of the fuel pump simulator by the testing application. In an embodiment, the PIN entry robot is aligned to the PIN pad, and the PIN pad is aligned to make an angle of between 30 degrees to horizontal and 60 degrees to horizontal, as described with reference to FIG. 2A, FIG. 2B, and FIG. 2C above. For example, the testing application may command an NFC stimulus device to emit radio waves or electromagnetic waves that carry payment information that is received by the NFC reader 122.

At block 234, the method 220 comprises receiving information about the response of the fuel pump simulator by the testing application. In an embodiment, the information received by the testing application about the response of the fuel pump simulator comprises digital images of displays of the fuel pump simulator, for example digital images of the main display 112, digital images of the fuel display 124, and digital images of the fuel grade price displays 120. At block 236, the method 220 comprises determining a test case result by the testing application based on comparing the information about the response of the fuel pump simulator to expected output defined by the test case. In an embodiment, the testing application converts digital images of displays to textual information and compares the textual information to expected textual information defined by the test case. In an embodiment, the processing of block 236 comprises creating the test case result 158 and storing it in the memory 152 of the fuel pump test integration subsystem. The test case results 158 may be stored in a transitory portion of the memory 152 and/or in a non-transitory portion of the memory 152. At block 238, if all of the test cases desired to be executed have not completed, the method 220 returns to block 230. The method 220 may repeat the sequence of block 230, 232, 234, 236 a number of times equal to the number of test cases desired to be executed.

At block 238, if all of the test cases desired to be executed have completed, the method 220 proceeds to block 240. At block 240, the method 220 comprises sending a plurality of test case results by the testing application to the software builder application, for example to the software builder 166. In an embodiment, the processing of block 240 comprises sending the plurality of test case results 158 to the software deployment system 168. The software deployment system 168 may take further action based on the test case results 158, for example notifying software developers of failed test cases associated with software they have recently checked-in in the software configuration control system 164 and/or notifying managers of software development projects.

Figure 5:
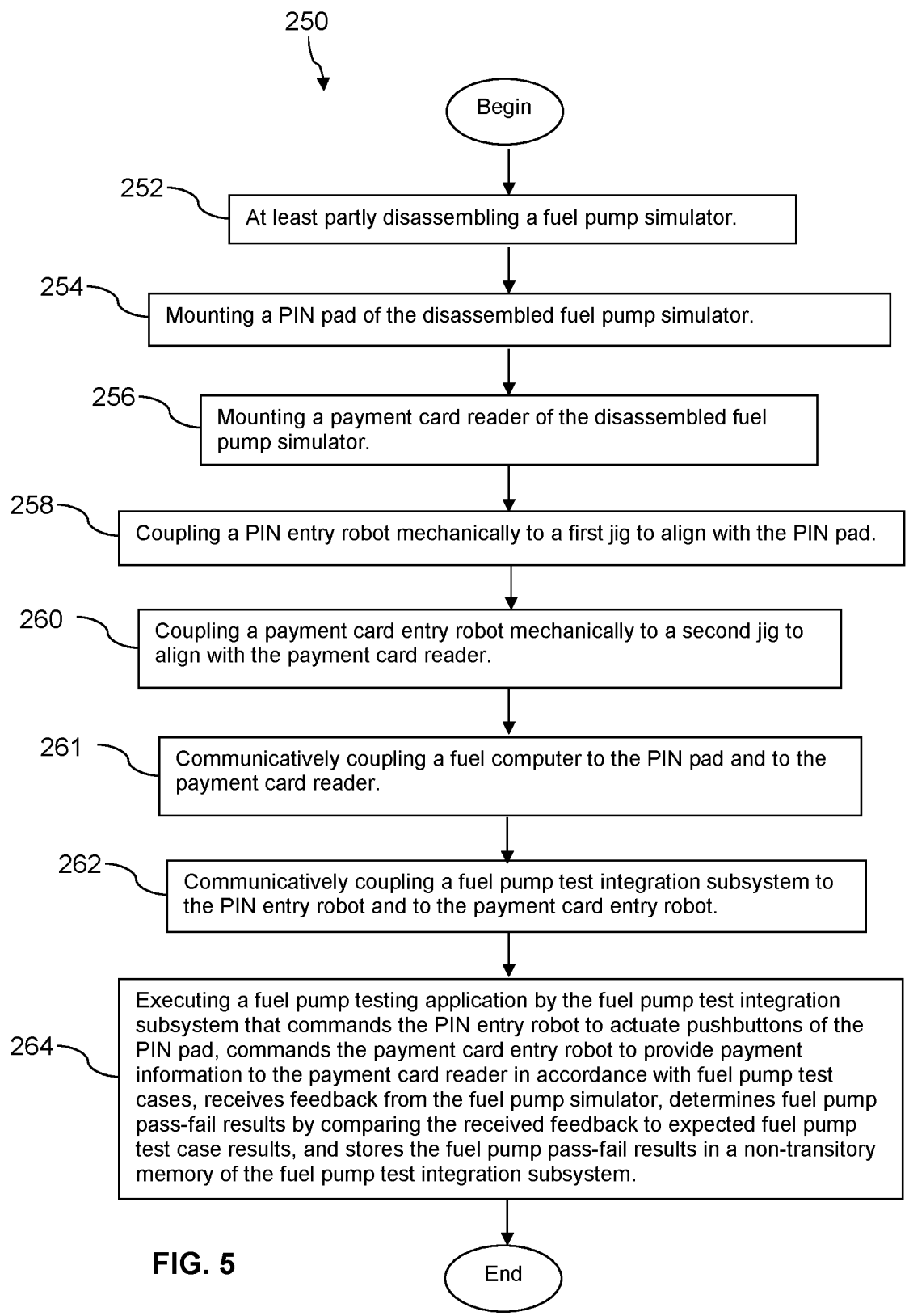
FIG. 5 is a flow chart of yet another method according to an embodiment of the disclosure.

Turning now to FIG. 5, a method 250 is described. In an embodiment, method 250 is a method of testing a fuel pump. At block 252, the method 250 comprises at least partly disassembling a fuel pump simulator.

At block 254, the method 250 comprises mounting a PIN pad of the disassembled fuel pump simulator. The PIN pad may be mounted to a structure of a test environment, for example to a desk or to a fixture base. At block 256, the method 250 comprises mounting a payment card reader of the disassembled fuel pump simulator. The payment card reader may be mounted to a structure of the test environment, for example to a desk or to a fixture base.

At block 258, the method 250 comprises coupling a PIN entry robot mechanically to a first jig to align with the PIN pad. In an embodiment, the PIN pad may be coupled mechanically to the first jig or to a structure that the first jig is mounted to. In an embodiment, the PIN entry robot is mounted at a same angle as an angle the PIN pad makes with a horizontal. In an embodiment, the PIN pad and the PIN entry robot make an angle of between 30 degrees to horizontal and 60 degrees to horizontal. At block 260, the method 250 comprises coupling a payment card entry robot mechanically to a second jig to align with the payment card reader. In an embodiment, the payment card reader may be coupled mechanically to the second jig or to a structure that the second jig is mounted to. At block 261, the method 250 comprises communicatively coupling a fuel computer to the PIN pad and to the payment card reader. The processing of block 261 may comprise communicatively coupling the fuel computer to the relays 126, to the fuel display 125, to the main display 112, to the main display keys 114, to the NFC reader 122, and to the fuel grade price displays 120. Communicatively coupling the fuel computer 127 to components may comprise connecting wires between the fuel computer 127 and components and/or connecting cables between the fuel computer 127 and components.

At block 262, the method 250 comprises communicatively coupling a fuel pump test integration subsystem to the PIN entry robot and to the payment card entry robot. In an embodiment, the method 250 further comprises communicatively coupling a plurality of fuel grade selection relays to the fuel pump test integration subsystem and to the at least partly disassembled fuel pump simulator.

At block 264, the method 250 comprises executing a fuel pump testing application by the fuel pump test integration subsystem that commands the PIN entry robot to actuate pushbuttons of the PIN pad, commands the payment card entry robot to provide payment information to the payment card reader in accordance with fuel pump test cases, receives feedback from the fuel pump simulator, determines fuel pump pass-fail results by comparing the received feedback to expected fuel pump test case results, and stores the fuel pump pass-fail results in a non-transitory memory of the fuel pump test integration subsystem. In an embodiment, the fuel pump testing application further commands one of the fuel grade selection relays to activate to select a fuel grade.

Figure 6:
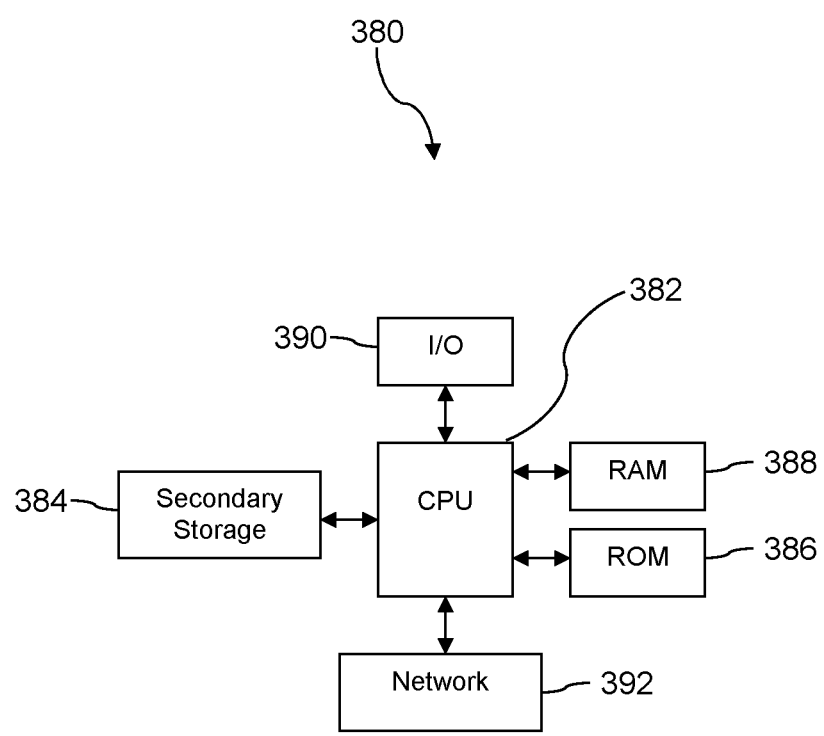
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing fuel to consumers at fuel pumping stations, comprising:
    installing a given version of a software update in a fuel pump simulator, wherein the fuel pump simulator comprises a personal identification number (PIN) pad, a plurality of relays, a plurality of fuel grade price displays, a fuel display, a main display, and a first fuel computer communicatively coupled to the PIN pad, to the relays, to the fuel grade price displays, and to the fuel display, and to the main display;
    testing the given version of the software update in the fuel pump simulator by an application executing on a processor of an automated fuel pump test platform, wherein the testing comprises a PIN entry robot of the automated fuel pump test platform keying a PIN into the PIN pad of the fuel pump simulator, commanding one of the relays to actuate, wherein actuating the one of the relays simulates selection of a fuel grade, capturing a picture of the fuel display by a camera of the automated fuel pump test platform, capturing a picture of the main display by a camera of the automated fuel pump test platform, comparing the picture of the fuel display to an expected fuel display by the automated fuel pump test platform, and comparing the picture of the main display to an expected main display by the automated fuel pump test platform;
    detecting an error in the given version of the software update by the automated fuel pump test platform;
    after testing the given version of the software update, installing the software update into a second fuel computer at a fuel pumping station;
    receiving an input from a payment card by a fuel pump at the fuel pumping station;
    receiving a fuel grade selection input by the fuel pump at the fuel pumping station; and
    based on the fuel computer at the fuel pump station executing the software update, pumping fuel by the fuel pump at the fuel pump station, whereby a fuel tank of a vehicle is provided with fuel.

2. The method of claim 1, further comprising:
    installing a modified version of the software update in the fuel pump simulator, wherein the modified version of the software update is developed to correct the error detected in the given version of the software update;
    testing the modified version of the software update in the fuel pump simulator by the automated fuel pump test platform; and
    after testing the modified version of the software update, installing the modified version of the software update in a plurality of fuel pumps at a plurality of fuel pumping stations.

3. The method of claim 1, wherein the PIN entry robot is maintained in alignment with the PIN pad to align an axis of actuation of the PIN entry robot to be substantially perpendicular to a plurality of keys of the PIN pad.

4. The method of claim 1, wherein detecting an error in the given version of the software update comprises the automated fuel pump test platform comparing display information developed by automatically analyzing pictures of a display of the fuel pump simulator to expected test case results and determining that the display information and the expected test case results do not match.

5. The method of claim 1, wherein the given version of the software update comprises software artifacts and firmware artifacts.

6. The method of claim 1, wherein the fuel pump simulator comprises a plurality of relays and testing the given version of the software update in the fuel pump simulator by the automated fuel pump test platform comprises sending an activation signal by the automated fuel pump test platform to the relays.

7. A fuel pump functional test system, comprising:
a fuel pump simulator comprising a personal identification number (PIN) pad, a plurality of fuel grade price displays, a plurality of relays, a fuel display, a main display, and a fuel computer communicatively coupled to the PIN pad, the fuel grade price displays, the relays, the fuel display, and the main display;
a PIN entry robot aligned with the PIN pad to align an axis of actuation of the PIN entry robot to be substantially perpendicular to a plurality of keys of the PIN pad;
at least one camera aligned to take pictures of one or more of the displays; and
a fuel pump test integration subsystem communicatively coupled to the relays, to the PIN entry robot, and to the at least one display camera, comprising a processor, a non-transitory memory storing a plurality of fuel pump test cases, and an application stored in the non-transitory memory that, when executed by the processor, executes at least some of the fuel pump test cases,
when executing one of the fuel pump test cases, commands relays to actuate,
when executing the fuel pump test case, commands the PIN entry robot to actuate pushbuttons of the PIN pad,
when executing the fuel pump test case, receives a picture of a fuel grade price display from the at least one camera, a picture of the main display, and a picture of a fuel display,
when executing the fuel pump test case, determines a test case result based on comparing information presented in the picture of the fuel grade display, information presented in the picture of the main display, and information presented in the picture of the fuel display to expected results defined by the test case, and
stores the test results of executing the at least some of the fuel pump test cases in the non-transitory memory.

8. The fuel pump functional test system of claim 7, wherein the fuel pump simulator is partially disassembled from a form delivered by a supplier of a fuel pump simulator.

9. The fuel pump functional test system of claim 7, wherein the fuel pump simulator further comprises a payment card reader, further comprising a payment card entry robot, wherein the application, when executing one of the fuel pump test cases, commands the payment card entry robot to provide payment information via a payment card proxy.

10. The fuel pump functional test system of claim 9, wherein the application commands the payment card proxy to present credit card magnetic stripe information associated with a credit card institution and with a particular credit card account.

11. The fuel pump functional test system of claim 9, wherein the fuel pump simulator further comprises a near field communication (NFC) reader, further comprising an NFC stimulus device, wherein the application commands the NFC stimulus device to complete a contactless payment interaction with the NFC reader.

12. The fuel pump functional test system of claim 7, wherein the at least one camera is mounted in a corresponding at least one shielding box.

13. The fuel pump functional test system of claim 7, wherein the fuel pump simulator comprises display keys associated with the main display, further comprising a main display robot aligned to the display keys associated with the main display, wherein the application, when executing the fuel pump test case, commands the main display robot to actuate the display keys associated with the main display.

14. The fuel pump functional test system of claim 7, wherein the fuel pump functional test system tests the functionality of the fuel pump simulator with a software update installed.

15. A method of testing fuel pumps, comprising:
checking a software change into a configuration control system;
in response to checking the software change into the configuration control system, building a fuel computer executable by a software builder application executing on a computer system based on the software change;
downloading the fuel computer executable into a fuel computer of a fuel pump simulator by a software deployment application executing on the computer system;
launching execution of a testing application on a fuel pump test integration subsystem by the application;
executing a plurality of fuel pump test cases by the testing application, wherein executing a fuel pump test case comprises
commanding relays of the fuel pump simulator to actuate by the testing application,
commanding input of payment information to the fuel pump simulator by the testing application,
receiving information about the response of the fuel pump simulator by the testing application, and
determining a test case result by the testing application based on comparing the information about the response of the fuel pump simulator to expected output defined by the test case;
and
sending a plurality of test case results by the testing application to the software builder application.

16. The method of claim 15, wherein commanding input of payment information comprises commanding a PIN entry robot to actuate keys of a PIN pad of the fuel pump simulator, wherein the PIN entry robot is aligned to the PIN pad, and the PIN pad is aligned to make an angle of between 30 degrees to horizontal and 60 degrees to horizontal.

17. The method of claim 15, wherein the information received by the testing application about the response of the fuel pump simulator comprises digital images of displays of the fuel pump simulator.

18. The method of claim 17, wherein the testing application converts the digital images to textual information and compares the textual information to expected textual information defined by the test case.

19. The method of claim 15, wherein the fuel pump simulator is a partially disassembled fuel pump simulator provided by a fuel pump manufacturer.

20. The method of claim 19, wherein the partially disassembled fuel pump simulator replaces fuel grade select pushbuttons with relays in the fuel pump simulator.

21. A method of testing a fuel pump, comprising:
at least partly disassembling a fuel pump simulator;

mounting a personal identification number (PIN) pad of the disassembled fuel pump simulator;

mounting a payment card reader of the disassembled fuel pump simulator;

coupling a PIN entry robot mechanically to a first jig to align with the PIN pad;

coupling a payment card entry robot mechanically to a second jig to align with the payment card reader;

communicatively coupling a fuel computer to the PIN pad and to the payment card reader;

communicatively coupling a fuel pump test integration subsystem to the PIN entry robot and to the payment card entry robot; and executing a fuel pump testing application by the fuel pump test integration subsystem that commands the PIN entry robot to actuate pushbuttons of the PIN pad, commands the payment card entry robot to provide payment information to the payment card reader in accordance with fuel pump test cases, receives feedback from the fuel pump simulator, determines fuel pump pass-fail results by comparing the received feedback to expected fuel pump test case results, and stores the fuel pump pass-fail results in a non-transitory memory of the fuel pump test integration subsystem.

22. The method of claim 21, further comprising communicatively coupling a plurality of to the fuel pump test integration subsystem, to the fuel computer, and to the at least partly disassembled fuel pump simulator.

23. The method of claim 22, wherein the fuel pump testing application further commands one of the relays to activate to select a fuel grade.

24. The method of claim 21, wherein the PIN pad and the PIN entry robot make an angle of between 30 degrees to horizontal and 60 degrees to horizontal.

25. The method of claim 1, wherein the PIN pad of the fuel pump simulator is maintained at an angle between 30 degrees relative to horizontal and 60 degrees relative to horizontal.

26. The fuel pump functional test system of claim 7, wherein the PIN pad is mounted at an angle between 30 degrees to horizontal and 60 degrees to horizontal.

* * * * *